US008213396B1

(12) United States Patent
Oroskar et al.

(10) Patent No.: US 8,213,396 B1
(45) Date of Patent: Jul. 3, 2012

(54) METHODS AND SYSTEMS FOR DISABLING PAGING TO A WIRELESS COMMUNICATION DEVICE

(75) Inventors: Siddharth S. Oroskar, Overland Park, KS (US); Srikanth Pulugurta, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 530 days.

(21) Appl. No.: 12/503,284

(22) Filed: Jul. 15, 2009

(51) Int. Cl.
*H04W 4/00* (2009.01)

(52) U.S. Cl. ........ 370/338; 370/315; 370/331; 370/329; 455/458; 455/436; 455/445; 455/553.1; 455/554.1

(58) Field of Classification Search .................. 370/338, 370/315, 336, 331, 328, 329; 455/458, 445, 455/421, 553.1, 437, 436, 554.1, 413, 451
See application file for complete search history.

(56) References Cited

U.S. PATENT DOCUMENTS

| | | | |
|---|---|---|---|
| 5,737,703 A | 4/1998 | Byrne | |
| 5,774,461 A | 6/1998 | Hyden et al. | |
| 5,898,679 A | 4/1999 | Brederveld et al. | |
| 5,907,540 A | 5/1999 | Hayashi | |
| 6,115,762 A | 9/2000 | Bell et al. | |
| 6,205,495 B1 | 3/2001 | Gilber et al. | |
| 6,292,747 B1 | 9/2001 | Amro et al. | |
| 6,327,254 B1 | 12/2001 | Ghuah | |
| 6,330,244 B1 | 12/2001 | Swartz et al. | |
| 6,366,573 B1 * | 4/2002 | Smith et al. | 370/349 |
| 6,438,117 B1 | 8/2002 | Grilli et al. | |
| 6,477,382 B1 * | 11/2002 | Mansfield et al. | 455/458 |
| 6,680,923 B1 | 1/2004 | Leon | |
| 7,193,987 B2 | 3/2007 | Vilander | |
| 7,376,091 B1 | 5/2008 | Eccles et al. | |
| 7,408,948 B2 | 8/2008 | Lopponen et al. | |
| 7,471,950 B1 * | 12/2008 | Oh et al. | 455/436 |
| 7,668,136 B2 * | 2/2010 | Yu | 370/329 |
| 7,720,021 B1 * | 5/2010 | Zhou et al. | 370/315 |
| 7,733,816 B2 * | 6/2010 | Hwang | 370/310 |
| 2001/0036830 A1 | 11/2001 | Wu et al. | |
| 2003/0091021 A1 | 5/2003 | Trossen et al. | |
| 2004/0236850 A1 | 11/2004 | Krumm et al. | |
| 2007/0202891 A1 * | 8/2007 | Diachina et al. | 455/458 |
| 2007/0232310 A1 * | 10/2007 | Schiff et al. | 455/436 |
| 2007/0268873 A1 * | 11/2007 | Borella et al. | 370/338 |
| 2008/0305799 A1 * | 12/2008 | Zuniga et al. | 455/437 |

OTHER PUBLICATIONS

Internet Engineering Task Force ("IETF") Request for Comments ("RFCs") 768, "Using Datagram protocol " Aug. 1980.
U.S. Appl. No. 11/455,602, filed Jun. 19, 2006.
U.S. Appl. No. 11/393,058, filed Mar. 30, 2006.
Office Action from U.S. Appl. No. 11/393,058, dated Jan. 21, 2009.

(Continued)

*Primary Examiner* — Ricky Ngo
*Assistant Examiner* — Rasheed Gidado

(57) ABSTRACT

Methods and systems for disabling paging to a WCD that fails to communicate properly with a RAN are introduced. In an exemplary embodiment, a first WCD that fails to communicate properly with the RAN may inform the RAN of the failure to communicate by relaying a message to the RAN via a second WCD. The second WCD preferably is able to communicate properly with the RAN. Upon receiving the message from the second WCD, the RAN may disable paging to the first WCD, thereby helping to conserve data storage, processing cycles, and paging channel capacity at the RAN.

17 Claims, 6 Drawing Sheets

OTHER PUBLICATIONS

Internet Engineering Task Force ("IETF") Request for Comments ("RFCs") 791, "Internet Protocol DARPA Internet Program Protocol Specification," Information Sciences Institute, Sep. 1981.

Internet Engineering Task Force ("IETF") Request for Comments ("RFCs") 793, "Transmission Control Protocol DARPA Internet Program Protocol Specification," Information Sciences Institute, Sep. 1981.

Internet Engineering Task Force ("IETF") Request for Comments ("RFCs") 2002, "IP Mobility Support," C. Perkins, Oct. 1996.

Internet Engineering Task Force ("IETF") Request for Comments ("RFCs") 2003, "IP Encapsulation within IP," C. Perkins, Oct. 1996.

Internet Engineering Task Force ("IETF") Request for Comments ("RFCs") 2004, "Minimal Encapsulation within IP," C. Perkins, Oct. 1996.

Internet Engineering Task Force ("IETF") Request for Comments ("RFCs") 2005, "Applicability Statement for IP Mobility Support," J. Solomon, Oct. 1996.

Sutherland, "80211 Insights: 802.11b and 3G Synergies for 2002," 802.11 Planet, http://www.80211-planet.com/columns/article/0,4000,1781_950811,00.html, printed Feb. 22, 2002.

"E-200 Cassiopeia Pocket PC 2002," Casio, http://www.casio.com/personalpcs/products.cfm? section=19&products=4146, printed Feb. 22, 2002.

"Making Notebooks Truly Mobile," Techtv, http://www.techtv.com/freshgear/products/story/0,23008,3347281,00.html, printed Feb. 25, 2002.

"Product Description," WeRoam, http://www.weroam.com/, printed Feb. 25, 2002.

"Roaming Between WLAN and GSM Networks to Become Easier," thinkmobile, http://www.thinkmobile.com/laptops/news/00/48/33/, printed Feb. 25, 2002.

Internet Engineering Task Force ("IETF") Request for Comments ("RFCs") 768, "User Datagram Protocol," J. Postel, Aug. 1980.

* cited by examiner

METHODS AND SYSTEMS FOR DISABLING PAGING TO A WIRELESS COMMUNICATION DEVICE

BACKGROUND

As wireless communication systems grow in popularity, the breadth and scope of wireless coverage areas continue to improve. Today, wireless coverage is readily available in most major cities, as well as in many smaller cities, and along highways. While wireless coverage is expected to continue to improve, it may be cost-prohibitive for wireless coverage to be ubiquitous. Thus, from time to time, wireless communication devices (WCDs), such as mobile phones, may lose wireless coverage or otherwise fail to communicate properly with a radio access network (RAN) providing the wireless coverage.

This loss of coverage may be due to various reasons, such as the WCD changing its position to be outside of the wireless coverage areas of the RAN. The RAN may not be immediately aware that a WCD has lost wireless coverage. Therefore, if the RAN needs to communicate with the WCD, such as to inform the WCD of an incoming voice call or data session, the RAN may attempt to contact the WCD by sending the WCD a page message. However, because the WCD has lost coverage, this paging attempt is likely to fail.

OVERVIEW

Paging a WCD utilizes resources at the RAN, such as processing power and data storage capacity. Furthermore, attempting to page a WCD also utilizes wireless network capacity. These resources are better used serving WCDs that are in wireless coverage rather than attempting to serve WCDs that have lost wireless coverage. Thus, it would be advantageous for a WCD that is out of wireless coverage to be able to inform the RAN that the WCD is out of wireless coverage. In this way, the RAN could take into account the presumption that paging attempts to this WCD will most likely be in vain by disabling paging to the WCD.

Therefore, in order to attempt to conserve RAN resources when a WCD is out of coverage, methods and devices for disabling paging to a WCD that fails to communicate properly with a RAN are introduced. In particular, a first WCD that that fails to communicate properly with a RAN may inform the RAN of this failure by relaying a message to the RAN via a second WCD that is in RAN coverage. Upon receiving the message, the RAN preferably disables paging to the first WCD, thereby conserving data storage, processing cycles, as well as paging channel capacity at the RAN.

Accordingly, in a first embodiment, a first WCD and a second WCD are both capable of communicating with a RAN according to a first wireless communication technology, and are also capable of communicating with one another according to a second wireless communication technology. Thus, for example, the first WCD and the second WCD may be able to have voice and data access to the Internet and the public switched telephone network (PSTN) via a cellular communication technology. Also, the first WCD and the second WCD may be able to communicate directly with one another via a short-range wireless communication technology.

In such a scenario, the first WCD may make a first determination that the first WCD has failed to communicate properly with the RAN. For example, the WCD may be out of the RAN's coverage, or otherwise unable to communicate via the RAN's wireless coverage areas. In response to making the first determination, the first WCD may transmit a first message to a second WCD. Preferably, the first message (i) seeks to disable paging from the RAN to the first WCD, (ii) is transmitted according to the second wireless communication technology, and (iii) includes a first WCD identifier that uniquely identifies the first WCD.

The second WCD may receive the first message, and in response, the second WCD may transmit a second message to the RAN. Preferably, the second message (i) seeks to disable paging from the RAN to the first WCD, (ii) is transmitted according to the first wireless communication technology, and (iii) includes the first WCD identifier. In this way, the first WCD can use the second wireless communication technology to relay a message to the RAN via the second WCD, even though the first WCD may not be able to effectively communicate with the RAN via the first communication technology.

In a second embodiment, the RAN may receive the second message from the second WCD. In response to receiving the second message, the RAN may disable paging to the first WCD. The RAN disabling paging may take the form of, for instance, the RAN removing an entry for the first WCD in a visitor location register (VLR).

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

DESCRIPTION

In accordance with exemplary embodiments, methods and devices for disabling paging to a WCD that has failed to communicate properly with a RAN are introduced. Preferably, a first WCD determines that it cannot communicate properly with a RAN, and relays a message to the RAN via a second WCD. The message may request that the RAN disable paging to the first WCD. Upon receiving the message, the RAN may disable paging to the first WCD.

I. SYSTEM ARCHITECTURE

Figure 1:
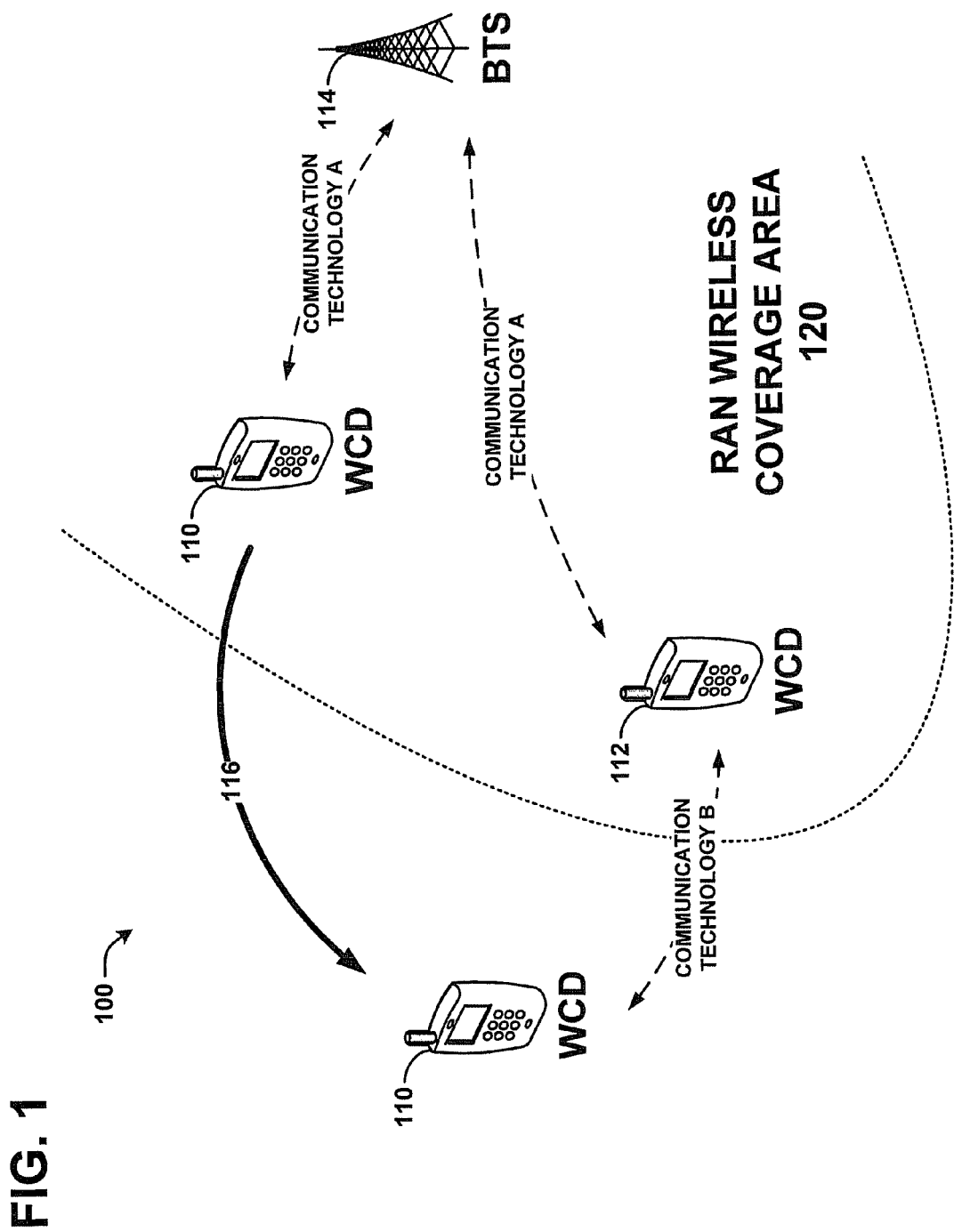
FIG. 1 depicts a wireless communication system, in accordance with an exemplary embodiment.

FIG. 1 is a simplified block diagram of an exemplary communication network 100, in which exemplary embodiments may be employed. Network 100 may include base transceiver station (BTS) 114 that can communicate with a first WCD 110 and a second WCD 112 via one or more wireless coverage areas, such as wireless coverage area 120. BTS 114 may radiate to define the wireless coverage areas, and each wireless coverage area may provide air interface access to one or more WCDs. The air interface may include a forward-link, supporting communication from BTS 114 to WCDs, and/or a reverse-link, supporting communication from the WCDs to BTS 114. Thus, through the forward-link and the reverse-link, the WCDs may exchange signaling, voice, data, video, or other media with one or more endpoints. These endpoints may include other WCDs, e-mail servers, World Wide Web servers, gaming servers, media servers, media gateways, and/or location-based services. The communication between the WCDs served by wireless coverage area 120 and these endpoints may occur via a packet-switched network (e.g., the Internet or private Internet Protocol (IP) network), and/or a circuit-switched network, such as the PSTN.

FIG. 1 does not depict other devices and/or systems that may be part of a RAN. However, the embodiments herein may involve one or more base station controllers (BSCs), radio network controllers (RNCs), mobile switching centers (MSCs), packet data serving nodes (PDSNs), as well as additional nodes, devices, and components.

Preferably WCDs, such as WCD 110 and WCD 112, communicate with BTS 114 according to a particular wireless communication technology, which may be referred to herein as wireless communication technology A. Wireless communication technology A may be a local or wide area communication technology such as Code Division Multiple Access (CDMA), Worldwide Interoperability for Microwave Access (WIMAX®), Universal Mobile Telecommunications System (UMTS), Long Term Evolution (LTE®), BLUETOOTH®, infrared, IEEE 802.11 (WIFI®), and so on.

Additionally, WCD 110 and WCD 112 may communicate with one another via a further wireless communication technology, which may be referred to herein as wireless communication technology B. Wireless communication technology B may also be a local or wide area communication technology such as CDMA, WIMAX®, UMTS, LTE®, BLUETOOTH®, infrared, WIFI®, and so on. Preferably, but not necessarily, wireless communication technology A is a wide area communication technology, while wireless communication technology B is a local area communication technology. However both of these wireless communication technologies could be either local area or wide area communication technologies, and may even be the same wireless communication technologies.

Thus, suppose that WCD 110 and WCD 112 are both within wireless coverage area 120 and communicating with BTS 114 via wireless communication technology A. If WCD 110 roams 116 out of wireless coverage area 120, WCD 110 may still be able to communicate with WCD 112 via wireless communication technology B. In this way, WCD 110 may still be able to communicate with BTS 114 (and the RAN) by relaying messages through WCD 112. Similarly, if WCD 112 roams out of wireless coverage area 120, but WCD 110 is still able to communicate via wireless coverage area 120, WCD 112 may still be able to communicate with BTS 114 (and the RAN) by relaying messages through WCD 110.

II. PAGING

Each of the forward-link and the reverse-link channels in a wireless coverage area may consist of one or more signaling and/or traffic channels. Typically, each WCD commonly listens to and/or communicates on one or more signaling channels. However, in order to conserve wireless resources and capacity, each WCD may only be allocated a traffic channel when the WCD needs to transmit or receive bearer (voice and/or data) traffic.

Thus, for example, a RAN may communicate periodically or continuously with a WCD via one or more signaling channels while the WCD is not transmitting or receiving voice or data. These signaling channels may allow the RAN to track the power requirements, location, and telemetry data of the WCD. Then, when the WCD engages in voice or data communication, the RAN may allocate one or more traffic channels to the WCD as the WCD transmits or receives bursts of the voice or data.

Consequently, WCD 110 and WCD 112 may be in either an "idle" or an "active" mode with respect to traffic channels. An "idle" WCD is not on another voice call or otherwise involved in an ongoing communication session, and accordingly may not be allocated any forward-link or reverse-link traffic channels. On the other hand, an "active" WCD may be on an ongoing voice call or otherwise involved in an ongoing communication session, and accordingly may be allocated one or more forward-link or reverse-link traffic channels.

When a WCD is "idle" the WCD may need to be "paged" so that the WCD can acquire traffic channels in order to communicate with the RAN. Paging is an activity that is typically initiated by the RAN and may occur over one or more dedicated forward-link paging channels. Such a paging channel may operate according to time-division multiplexing (TDM). Thus, each paging channel may be divided into a number of time slots in which the RAN may transmit a page request message to a WCD.

In normal operation, the RAN may determine that a WCD should be paged (for example, a request for incoming packet-switched or circuited switched communication with the WCD has arrived at the RAN from an endpoint). Then, the RAN may transmit a page request message to the WCD during a slot on a paging channel. When the WCD receives a page request message, it will normally respond to the RAN with a connection request message. The WCD preferably transmits the connection request message to the RAN on an access channel, which may be another type of signaling channel supported by the air interface. After the RAN receives the connection request message from the WCD, the RAN preferably affirms the receipt of the page response message by transmitting a base station acknowledgement (BS-ACK) message on the paging channel to the WCD. Then, the RAN may allocate one or more traffic channels in the forward direction, the reverse direction, or both, so that the WCD can send and/or receive bearer traffic.

For purposes of example, consider the case of an incoming packet-switched voice call. To notify an idle WCD of the incoming call, the RAN may page the WCD. The WCD receives the page request message, then typically indicates to its user that they are being called (i.e., the WCD will "ring"). If the user answers the call, the RAN may allocate at least one traffic channel in each of the forward direction and the reverse direction for the transmission of bearer traffic (voice packets) in each of these directions. Once the traffic channels have been allocated, the WCD is no longer idle. Instead, it is considered to be active and may partake in the exchange of bearer traffic with the RAN. In the case of this example, the bearer traffic may be bidirectional voice.

In situations where the WCD does not receive a page request message for some reason, the RAN preferably retransmits the page request message. Typically, the RAN will retransmit page request messages until either the WCD responds or the RAN has transmitted a pre-determined number of page request messages. In the latter case, the RAN may give up the paging of the WCD, and the attempted bearer communication with the WCD fails.

One reason that the WCD might not receive such a series of page request messages is that the WCD has moved outside of the RAN's wireless coverage area(s). Alternatively, the WCD may be in the RAN's coverage area(s) but may be experiencing poor signal quality. Or, the WCD may be in the RAN's coverage area(s), experiencing reasonable signal quality, but the RAN or its paging channel may be congested. Regardless of the exact reason, from time to time, a RAN will attempt to page a WCD, but will fail.

Given that there may be a limited amount of paging channel capacity per wireless coverage area (e.g., there may be a limited number of slots per TDM cycle on the each paging channel), it is advantageous for the RAN to avoid paging WCDs when it is certain, or at least very likely, that the paging will fail. Doing so would conserve resources at the RAN and on the RAN's paging channels.

However, the RAN may not be aware that paging a given WCD is certain to fail, or likely to fail, until the RAN actually pages the given WCD and fails. Thus, it may be beneficial for the given WCD to be able to determine that it is likely that the RAN will be unable to page the given WCD, and for the given WCD to inform the RAN of this determination. However, if the given WCD has failed to communicate properly with the RAN, the given WCD may not be able to inform the RAN directly of this failure (e.g., the given WCD may be out of RAN coverage). Thus, the following sections describe methods and devices with which the given WCD can inform the RAN of this failure by relaying a message to the RAN via another WCD.

III. EXEMPLARY WCD

Figure 2A:
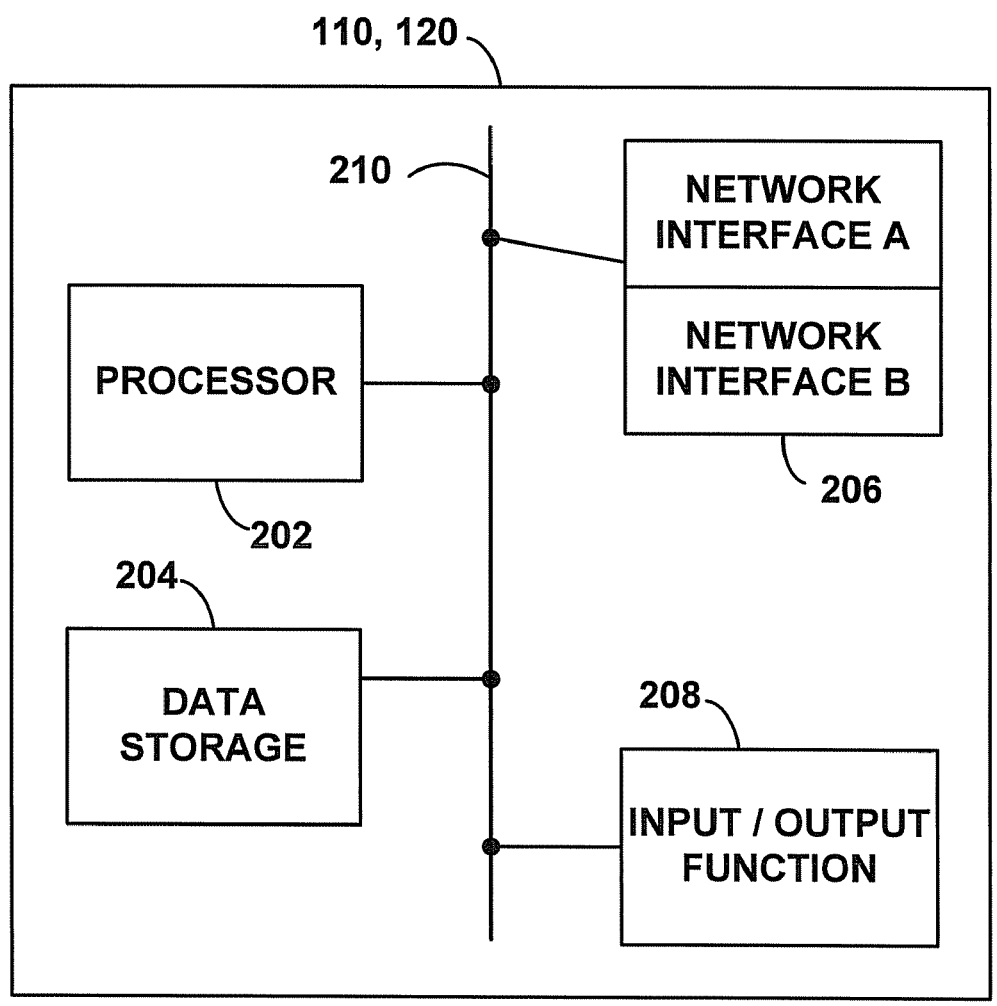
FIG. 2A is a block diagram of a WCD, in accordance with an exemplary embodiment.

FIG. 2A is a simplified block diagram of an exemplary WCD, such as WCD 110 or WCD 112. Such a WCD could be a wireless telephone, wireless personal digital assistant, wirelessly equipped laptop computer, wireless router, or another type of mobile or fixed wireless device. Preferably, the WCD is a subscriber device, which is manipulated by a human in order to communicate with various other endpoints. However, the WCD could also be an automated device without a human interface.

FIG. 2A depicts some of the functional components that would likely be found in a WCD arranged to operate in accordance with the embodiments described herein. The WCD preferably includes a processor 202, a data storage 204, a network interface 206, and an input/output function 208, all of which may be coupled by a system bus 210 or a similar mechanism.

Processor 202 preferably includes one or more central processing units (CPUs), such as one or more general purpose processors and/or one or more dedicated processors (e.g., application specific integrated circuits (ASICs) or digital signal processors (DSPs), etc.) Data storage 204, in turn, may comprise volatile and/or non-volatile data storage (e.g., memory) and can be integrated in whole or in part with processor 202.

Data storage 204 preferably holds program instructions executable by processor 202, and data that is manipulated by these instructions, to carry out various functions described herein. Alternatively, the functions can be defined by hardware, firmware, and/or any combination of hardware, firmware and software.

Network interface 206 may take the form of a wireless network interface, perhaps operating according to any local or wide area protocol or protocols used to communicate with other WCDs or with a BTS. Preferably, network interface 206 is logically or physically divided into network interface A and network interface B. Network interface A may be arranged to communicate according to a first wireless communication technology, such as wireless communication technology A. Similarly, network interface B may be arranged to communicate according to a second wireless communication technology, such as wireless communication technology B. For instance, network interface A and network interface B may be wireless radios capable of transmitting and receiving information according to one or more wireless protocols.

Input/output function 208 facilitates user interaction with the WCD. Thus, input/output function 208 may comprise multiple types of input devices, such as a keypad, a keyboard, a microphone, a mouse, a trackball, a dial, a touch screen, and so on. Similarly, input/output function 208 may comprise multiple types of output devices, such as a display screen, a speaker, a monitor, a printer, or one or more light emitting diodes (LEDs). Additionally or alternatively, the WCD 110, 112 may support remote access from another device, via network interface 206 or via another interface (not shown), such a USB port. It should be understood that the exact input and output functions supported by WCD 110, 112 can differ from the types of input and output functions listed above while still allowing WCD 110, 112 to perform the embodiments described herein.

IV. EXEMPLARY RAN CONFIGURATION

Figure 2B:
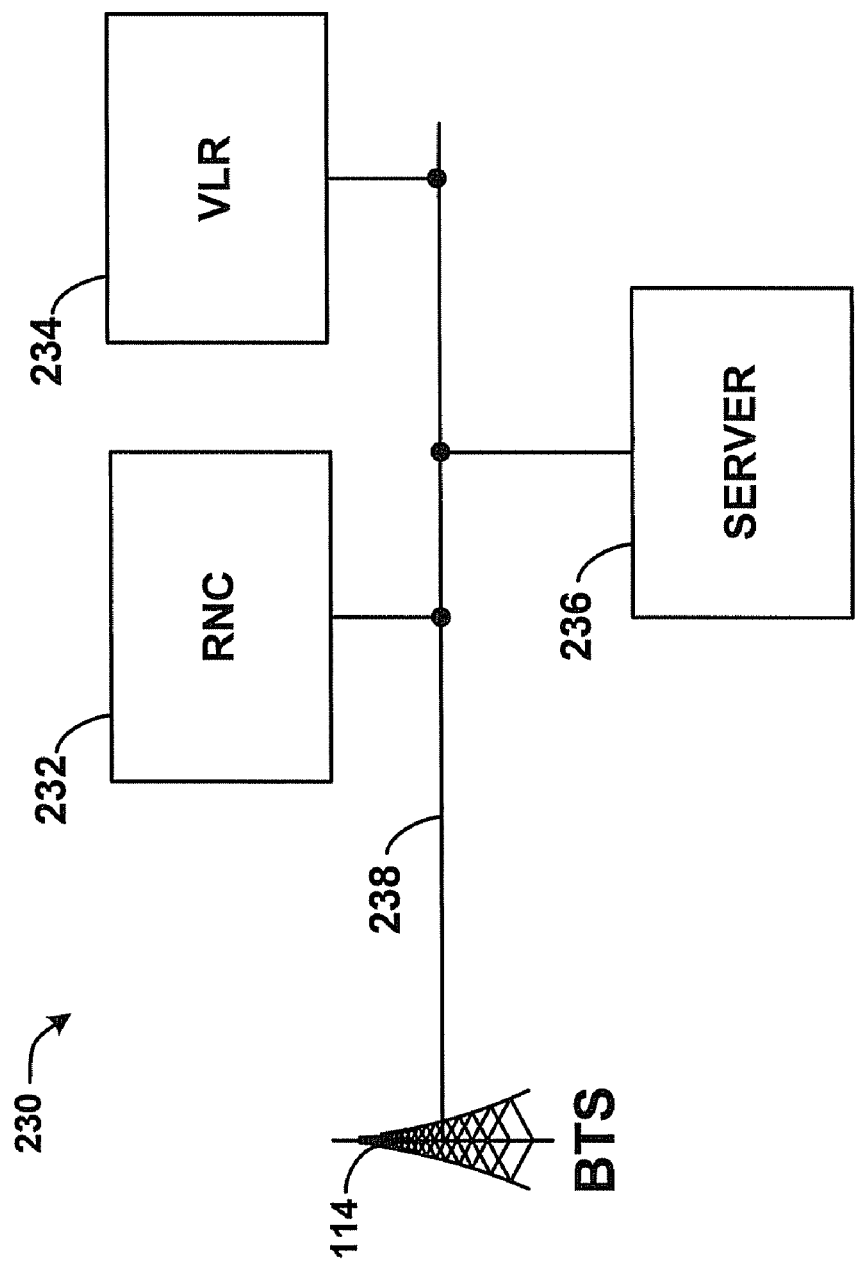
FIG. 2B depicts components of a RAN, in accordance with an exemplary embodiment.

FIG. 2B depicts exemplary RAN 230. RAN 230 is one possible configuration of some of the components of a RAN. Other RAN configurations are possible and, in practice, a RAN may include more or fewer components than depicted in FIG. 2B.

In RAN 230, BTS 114 is connected to RNC 232, VLR 234, and server 236 via communication link(s) 238. RNC 232 may control one or more BTSs. In particular, RNC 232 may determine how each BTS manages the WCDs in the BTS's wireless coverage area(s) and how each BTS manages the resources of these wireless coverage areas. For example, an RNC may instruct a BTS to assign wireless signaling or traffic channels to a WCD, increase or decrease power on these channels, or hand off the WCD to a different BTS. Data traffic, including voice, video, and multimedia services over IP, to and from each WCD, may flow through an RNC.

VLR 234 preferably contains a database with an entry for each WCD served by exemplary RAN 230. These entries may indicate that the WCDs are being served by at least one of the wireless coverage areas of exemplary RAN 230. Thus, when a WCD enters a RAN's wireless coverage area, the RAN may add an entry for the WCD into its VLR, and when the WCD leaves the RAN's wireless coverage area, the RAN may instruct the VLR to remove the entry. Information that may be in a VLR entry includes, but is not limited to, the WCD's International Mobile Subscriber Identity (IMSI), phone number, and subscribed services. Preferably, a RAN only pages a WCD if there is an entry for the WCD in the RAN's VLR.

Exemplary RAN 230 may also include server 236. Server 236 may receive messages from a second WCD that inform the RAN that a first WCD has failed to communicate properly with the RAN. Accordingly, server 236 may pass the information in these messages on to VLR 234 so that VLR 234 can remove an entry for the WCD from the VLR's database. It should be understood that RNC 232, VLR 234, and server 236, are optional components of RAN 230. Thus, other components of RAN 230 may take on the functions described herein as being performed by any of RNC 232, VLR 234, and/or server 236.

Exemplary RAN 230 is depicted in FIG. 2B as an example of a possible RAN configuration. However, it should be understood that other RAN configurations can be used with the embodiments described herein. For instance, exemplary RAN 230 could consist of more or fewer elements, and these elements may be physically or logically combined or divided in various ways. In one possible arrangement, a BTS, RNC, VLR and server may be combined into the same logical or physical device.

Furthermore, each of the elements of exemplary RAN 230 may include at least one processor, data storage, and program instructions stored in the data storage and executable by the processor to carry out RAN functions described herein.

V. EXEMPLARY OPERATION

Figure 3:
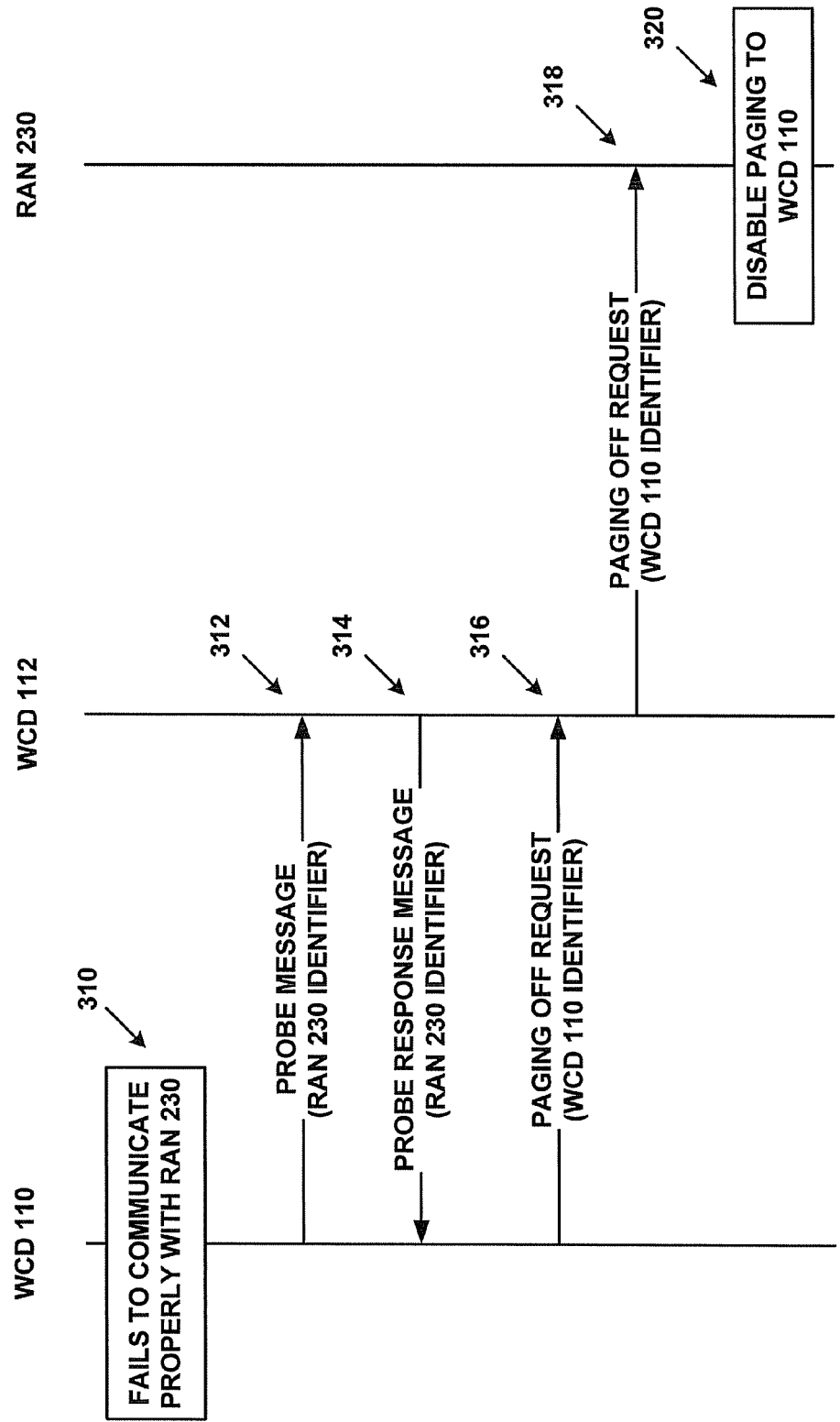
FIG. 3 is a call flow, in accordance with an exemplary embodiment.

FIG. 3 is a call flow 300 in accordance with an exemplary embodiment. In particular, call flow 300 illustrates a WCD that has failed to communicate properly with a RAN relaying a message to the RAN through another WCD, in order to inform the RAN of this failure.

In call flow 300, a first WCD (WCD 110) and a second WCD (WCD 112) are served by a wireless coverage area of RAN 230. Call flow 300 provides a series of steps that include WCD 110 (i) failing to communicate properly with RAN 230 on a first wireless communication interface, (ii) determining, via a second wireless communication interface, that a WCD 112 can communicate properly with RAN 230, and (iii) transmitting a "paging off" request to RAN 230 via WCD 112. It should be also understood that the types and names of the various messages discussed herein are merely referential. Other types of messages, as well as messages with other names, may be used without departing from the scope of the invention. For instance, each of the messages shown in call flow 300 may be acknowledged by acknowledgment messages flowing in the opposite direction.

At step 310, WCD 110 determines that it has failed to communicate properly with RAN 230 via a first wireless communication interface. WCD 110 can make this determination in a number of ways. For example, RAN 230 may transmit a pilot signal on a pilot channel in each of its wireless coverage areas. When a WCD is energized (turned on) or moves into the wireless coverage area, the WCD may search for and acquire the wireless coverage area's pilot signal. Then, the WCD may monitor the strength of the pilot signal. If the pilot signal's strength (as received by the WCD) drops below a given threshold, the WCD may determine that it has left the wireless coverage area or that the WCD's wireless coverage has become so poor that WCD effectively cannot communicate with the RAN.

The WCD may then attempt to acquire the pilot signal of a different wireless coverage area in order to hand off into this different wireless coverage area. However, if all available pilot signals are below the given threshold, the WCD may be out of RAN coverage.

Thus, a WCD may fail to communicate properly with a RAN if the WCD 110 detects that that pilot signal of its serving wireless coverage area, and potentially one or more other pilot signals, has dropped below a given threshold. However, the WCD can fail to communicate properly with the RAN in other ways as well. For instance, the WCD may unsuccessfully attempt to originate a voice or data session with the RAN. Alternatively, the WCD may be communicating with the RAN, but this communication may be subject to substantial loss, distortion, attenuation, or interference. In any of these circumstances and in other circumstances as well, the WCD can be said to have failed to communicate properly with the RAN.

Once the WCD determined that it has failed to communicate properly with the RAN, the WCD may seek to discover another WCD that can communicate properly with the RAN. In this way, the WCD can relay a message to the RAN, via the other WCD, informing the RAN of the failure. In doing so, the WCD may seek to have the RAN disable paging to the WCD, thereby conserving RAN resources.

Accordingly, at step 312, WCD 110 may transmit a probe message, via a second wireless communication interface. WCD 110 may send this probe message to one or more other WCDs, and the probe message may contain an identifier of RAN 230. To transmit this probe message, WCD 110 may use a different wireless communication technology than it used to communicate with the RAN. For instance, if WCD 110 uses CDMA to communicate with RAN 230, then WCD 110 may use BLUETOOTH®, WIFI®, infrared, or some other local area wireless technology to transmit the probe message. In order to converse power and battery life, WCD 110 may keep the second wireless communication in an "off" state, disabled, or in a low power mode, until WCD 110 determines that it will transmit the probe message. Then WCD 110 may enable or energize the second wireless communication interface, and keep that interface energized while it is in use.

The transmission of the probe message may be in the form of a broadcast message, a multicast message, or a series of unicast messages. Furthermore, the identifier of RAN 230 contained in the probe message may be used to indicate that WCD 110 is seeking to disable paging to itself from RAN 230. For example, the identifier of RAN 230 may include at least one of an address of RAN 230 (such as an IP address), a system identification (SID) number, a network identification (NID) number, geographic coordinates of RAN 230, or some other form of identification.

Regardless of the exact form of the probe message, the probe message may be received by WCD 112. Preferably, WCD 112 is within one of the wireless coverage areas of RAN 230. WCD 112 need not be in the same wireless coverage area that WCD 110 was previously served by. WCD 112 may determine, from at least the identifier of RAN 230, that it can communicate properly with RAN 230, and therefore is capable of serving as a relay for WCD 110.

Therefore, at step 314, WCD 112 may transmit a probe response message to WCD 110. This probe response message may also be transmitted according to a local area wireless communication technology, may contain the identifier of RAN 230, and may serve to inform WCD 110 that WCD 112 can currently communicate with RAN 230, and that WCD 112 is willing to serve as a relay for messages that WCD 110 may seek to transmit to RAN 230. Before, during or after step 314, WCD 110 may also receive similar probe response messages from other WCDs.

Thus, WCD 110 may be able to determine a list of WCDs that are willing and able to serve as relays. WCD 110 may then choose one or more of these WCDs to serve as the relay to RAN 230. If multiple WCDs are available to serve as a relay to WCD 110, WCD 110 may choose a WCD(s) based on various criteria. For example, WCD 110 may choose a WCD that is physically or topologically near to WCD 110. For purposes of simplicity, it is assumed herein that WCD 110 chooses WCD 112.

Thus, at step 316, WCD 110 may transmit a paging off request to WCD 112. This paging off request is preferably, but not necessarily, transmitted according to the same local area wireless communication technology as the probe message of step 312 and the probe response message of step 314. The paging off request may include an identifier of WCD 110, such as an IMSI, phone number, or another form of identifier.

At step 318, WCD 112 may transmit the paging off request, along with the identifier of WCD 110, to RAN 230. This time, the paging off request may be transmitted according to the wide area wireless communication technology, such as CDMA. For instance, WCD 112 may use a Short Message Service (SMS) message to transmit the paging off request to RAN 230. Alternatively, WCD 112 may use one or more signaling or data channels associated with RAN 230 for this purpose.

Regardless of how the paging off request arrives, at step 320, RAN 230 may disable paging to WCD 110. For instance, RAN 230 may remove an entry for WCD 110 from a VLR of RAN 230 in order to disable paging to WCD 110.

Call flow 300 may be enhanced with security features as well. For example, it would be advantageous for RAN 230 to be reasonably assured that the paging off request it receives at step 318 actually originated from a request by WCD 110. Otherwise, WCD 112, or some other WCD, could create a paging off request that results in paging being disabled to WCD 110 even if WCD 110 may be able to communicate properly with RAN 230. In order to avoid such a denial of service attack, RAN 230 may only honor paging off requests that are digitally signed (or otherwise validated) by the originating WCD.

A digital signature is a method of applying a cryptographic function to a message and a secret key in order to generate an output bit string. When the message is transmitted, the bit string may then be included with the message so that any holder of the secret key can validate that the message was signed by another holder of the secret key. In addition to secret keys, digital signatures may also use public-private key pairs to accomplish the same goal.

Furthermore, digital signatures also provide message integrity. Once a message is digitally signed with a given secret key, attempts to change the contents of the message may be detected by a holder of the secret key. Examples of digital signature schemes include the MD5 and SHA-1 hash functions. MD5 is defined in IETF RFC 1321, which is incorporated by reference in its entirety herein. SHA-1 is defined in IETF RFC 3174, which is also incorporated by reference in its entirety herein. Of course, other digital signature schemes could be used with the embodiments herein.

Thus, for instance, WCD 110 and RAN 230 may share a secret key. The secret key may be randomly generated by RAN 230 and distributed by RAN 230 to WCD 110, or it could be deployed in some other way. At step 316, WCD 110 may use the secret key and MD5 to digitally sign the paging off request. Then WCD 110 may append the resulting output of the MD5 function (i.e., the digital signature) to the paging off request before transmitting the paging off request to WCD 112. Then, at step 318, when RAN 230 receives the paging off request, RAN 230 may apply MD5 to the secret key and the message in the paging off request.

If the resulting output of the MD5 function matches the digital signature appended to the paging off request, then RAN 230 can be reasonably assured that WCD 110 transmitted the paging off request, and that the paging off request was not modified before reaching RAN 230. On the other hand, if the resulting output of the MD5 function does not match the digital signature appended to the paging off request, then RAN 230 may determine that either the paging off request did not originate from WCD 110, WCD 110 does not have the secret key, WCD 110 did not use the secret key when digitally signing the message, or the paging off request was modified between being sent by WCD 110 and being received by RAN 230. In any of these situations, it is desirable for RAN 230 to discard the paging off request and to leave paging to WCD 110 enabled.

Thus, the RAN may discard a paging off request when the RAN cannot determine that the paging off request actually originated from a WCD to which paging would be disabled. In this way, it is difficult for another party to accomplish a denial of service attack against the WCD.

In addition to the steps depicted in call flow 300, other steps may be performed by one or more of WCD 110, WCD 112, RAN 230, or other components not shown. In one embodiment, at some point after step 320, WCD 110 may determine that it can once again communicate properly with RAN 230. For instance WCD 110 may receive a pilot signal from one of the wireless coverage areas of RAN 230 that exceeds the given threshold. In response to making this determination, WCD 110 may register with RAN 230 via a wide area wireless communication technology, such as CDMA. This registration preferably results in RAN 230 enabling paging to WCD 110 once more.

In another embodiment, WCD 112 may support relaying messages on behalf of a third WCD. Thus, the third WCD may determine that it has failed to communicate properly with RAN 230. Then the third WCD, in response to making this determination, may transmit, according to a local area wireless communication technology, a paging off request to WCD 112. Preferably, the paging off request contains an identifier of the third WCD. WCD 112 may forward this paging off request to RAN 230, and RAN 230 may then disable paging to the third WCD.

Figure 4:
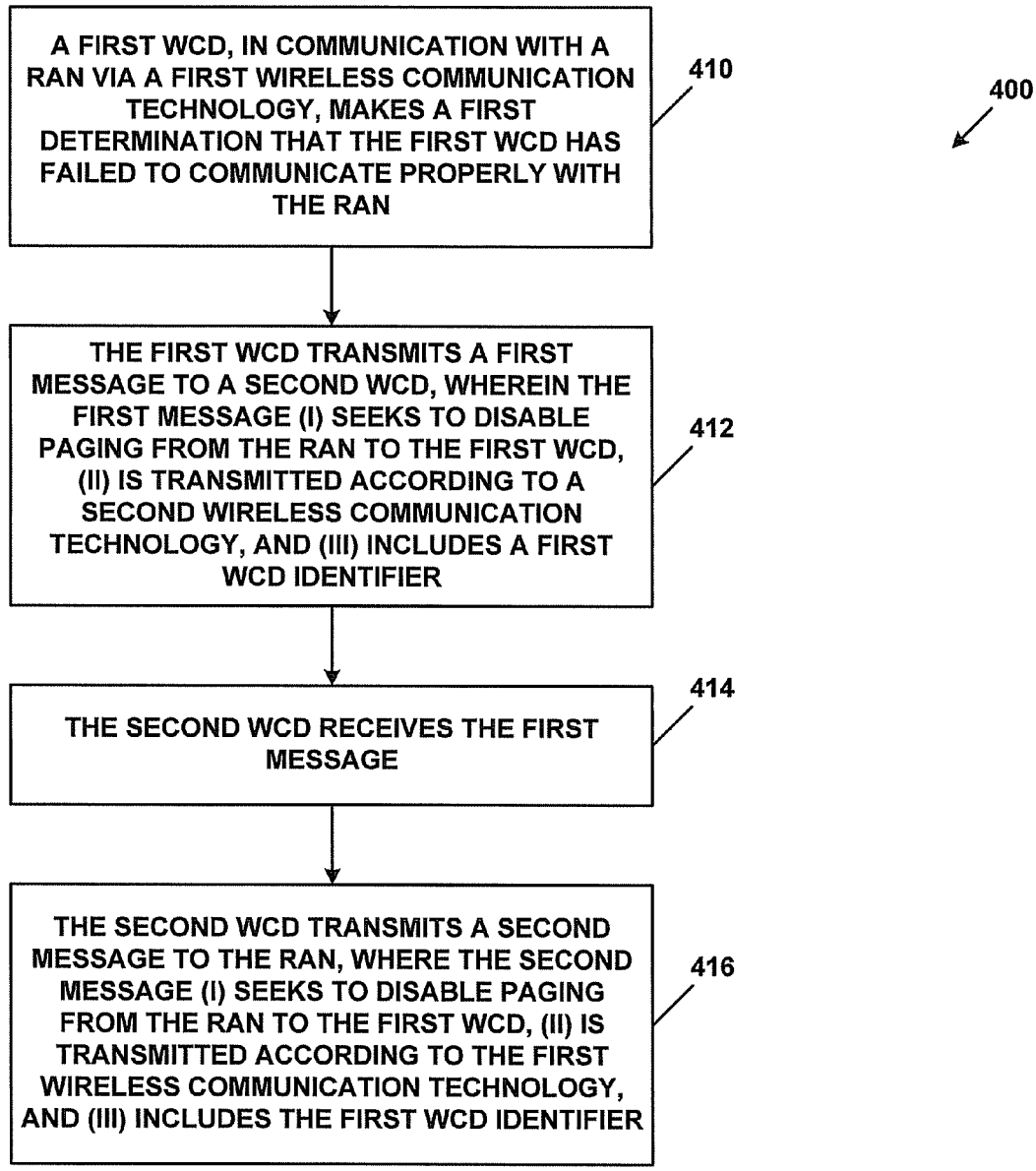
FIG. 4 is a flow chart, in accordance with an exemplary embodiment.
Figure 5:
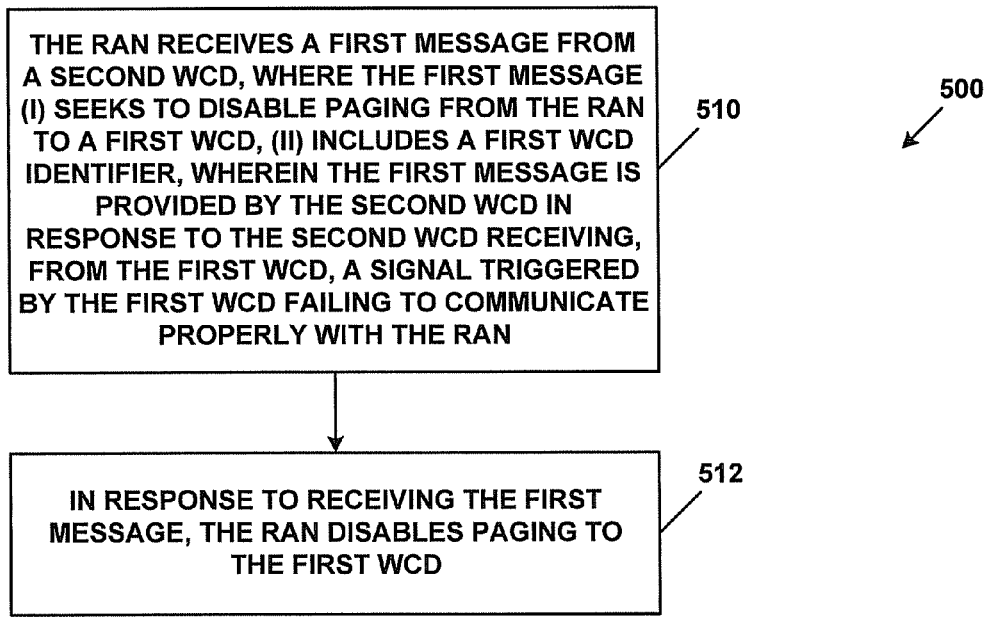
FIG. 5 is another flow chart, in accordance with an exemplary embodiment.

FIGS. 4 and 5 further illustrate, in the form of flow charts, some of the embodiments presented herein. It should be understood that the methods, processes, and transactions presented in these figures may occur in a different order, and fewer or more steps or events may occur without departing from the scope of the embodiments. Moreover, the methods, processes, and transactions depicted in these figures may be combined with one another wholly or in part, to form additional embodiments that are also within the scope of this invention.

FIG. 4 depicts a method 400 for disabling paging to a WCD from the perspective of the WCD. At step 410, first WCD, in communication with a RAN via a first wireless communication technology, makes a first determination that the first WCD has failed to communicate properly with the RAN. For instance, the first WCD may determine that a pilot signal from the RAN has dropped below a given threshold, and that the WCD cannot detect another pilot signal of sufficient strength. In response to making the first determination, the first WCD may transmit a first message to a second WCD. The first message may (i) seek to disable paging from the RAN to the first WCD, (ii) be transmitted according to a second wireless communication technology, and (iii) include a first WCD identifier.

At step 414, the second WCD may receive the first message. At step 416, the second WCD may transmit a second message to the RAN, where the second message may (i) seek to disable paging from the RAN to the first WCD, (ii) be transmitted according to the first wireless communication technology, and (iii) include the first WCD identifier. Preferably, upon receiving the second message, the RAN disables paging to the first WCD.

Note that in method 400, the first WCD performs a "client" function, while the second WCD performs a "relay" function. However, each WCD may be arranged to perform both client and relay functions, when appropriate. Thus, in other circumstances, the first WCD may also serve as a relay for messages from the second WCD to the RAN.

FIG. 5 depicts a method 500 for disabling paging to a WCD from the perspective of a RAN. Preferably, the RAN serves a first WCD and a second WCD via one or more wireless coverage areas. At step 510, the RAN receives a first message from the second WCD. The first message preferably (i) seeks to disable paging from the RAN to the first WCD, and (ii) includes a first WCD identifier. The first message may be provided by the second WCD in response to the second WCD receiving, from the first WCD, a signal triggered by the first WCD failing to communicate properly with the RAN. Accordingly, at step 512, in response to receiving the first message, the RAN may disable paging to the first WCD.

Additionally, as depicted in FIG. 2B, the RAN may include a VLR and a server. Preferably, the VLR contains entries for each WCD served by the RAN, including the first WCD. The first message may be received by the server. The server may then transmit a second message to the VLR, requesting that paging be disabled to the first WCD. Upon receiving the first message, the VLR may remove the entry for the first WCD from the VLR, thus disabling paging to the first WCD.

The first message may take the form of a Short Message Service (SMS) message. Thus, the server may be arranged to receive SMS messages at a given SMS destination address. For instance, this address may be an SMS phone number or an SMS short code. When the server receives an SMS (i.e., the first message) from the second WCD, the server may determine that this first message is seeking to disable paging to the first WCD. Accordingly, the server may use at least some of the information in the first message, such as the first WCD identifier, to form the second message that the server transmits to the VLR.

Additionally or alternatively, the RAN may be arranged to share a secret key with the first WCD. If this is the case, the first message may include a digital signature. The RAN may attempt to validate the first message by applying a digital signature scheme to a secret key and the first message, and then comparing the output of the digital signature scheme to the digital signature included in the first message. Unless the output and the digital signature match, the RAN may discard the first message without disabling paging to the first WCD.

Furthermore, after paging has been disabled to the first WCD, the RAN may receive a registration message from the first WCD. This registration message may indicate that the first WCD is once again able to communicate properly with the RAN. In response to receiving the registration message, the RAN may enable paging to the first WCD.

Moreover, the RAN may be arranged to be capable of communicating with a third WCD, also via a wide area wireless communication technology. The RAN may receive, from the second WCD, a message (i) seeking to disable paging to the third WCD, and (ii) including an identifier of the third WCD. In response to receiving this message, the RAN preferably disables paging to the third WCD.

VI. CONCLUSION

Exemplary embodiments have been described above. Those skilled in the art will understand, however, that changes and modifications may be made to these embodiments without departing from the true scope and spirit of the invention, which is defined by the claims.

What is claimed is:

1. In a system in which a radio access network (RAN) is capable of communicating with both a first wireless communication device (WCD) and a second WCD according to a first wireless communication technology, wherein the first WCD and the second WCD are capable of communicating with one another according to a second wireless communication technology, wherein the first WCD and the second WCD are both end-user devices, wherein the first WCD is associated with a first WCD identifier, and wherein the first WCD and the RAN share a secret key, a method comprising:

the first WCD making a first determination that the first WCD has failed to communicate properly with the RAN;

in response to making the first determination, the first WCD digitally signing at least the first WCD identifier with the secret key, and the first WCD transmitting a first message to the second WCD, wherein the first message (i) seeks to disable paging from the RAN to the first WCD, (ii) is transmitted according to the second wireless communication technology, and (iii) includes the signed first WCD identifier;

the second WCD receiving the first message; and in response to receiving the first message, the second WCD copying the signed first WCD identifier from the first message to a second message, and the second WCD transmitting the second message to the RAN, wherein the second message (i) seeks to disable paging from the RAN to the first WCD, (ii) is transmitted according to the first wireless communication technology, and (iii) includes the signed first WCD identifier, thereby providing the RAN with information with which to authenticate that an entity seeking to disable paging to the first WCD is the first WCD.

2. The method of claim 1, wherein the RAN is associated with a RAN identifier, the method further comprising:

responsive to the first WCD making the first determination, the first WCD determining a list of WCDs with which the first WCD can communicate using the second wireless communication technology, wherein the list includes the second WCD;

the first WCD transmitting a probe message providing the RAN identifier to the WCDs in the determined list; and the first WCD receiving a response to the probe message from the second WCD, wherein the response indicates that the second WCD is capable of communicating with the RAN.

3. The method of claim 1, wherein the RAN includes a server and a visitor location register (VLR), wherein the VLR stores an entry for the first WCD, wherein presence of the entry causes the RAN to enable paging for the first WCD, wherein the second WCD transmits the second message to the server, and wherein the first message and the second message both seek to remove the entry from the VLR.

4. The method of claim 1, further comprising:

after sending the first message, the first WCD making a second determination that the first WCD can communicate with the RAN; and in response to making the second determination, the first WCD, according to the first communication technology, registering with the RAN, thereby requesting that the RAN enable paging once again for the first WCD.

5. The method of claim 1, wherein the second message comprises a Short Message Service (SMS) protocol message.

6. The method of claim 1, wherein the RAN is capable of communicating with a third WCD according to the first wireless communication technology, wherein the third WCD and the second WCD are capable of communicating with one another using the second wireless communication technology, wherein the third WCD is an end-user device, and wherein the third WCD is associated with a third WCD identifier, the method further comprising:

the third WCD making a second determination that the third WCD has failed to communicate properly with the RAN;

in response to making the second determination, the third WCD transmitting a third message to the second WCD, wherein the third message (i) seeks to disable paging from the RAN to the third WCD, (ii) is transmitted according to the second wireless communication technology, and (iii) includes the third WCD identifier;

the second WCD receiving the third message; and in response to the receiving the third message, the second WCD transmitting a fourth message to the RAN, wherein the fourth message (i) seeks to disable paging from the RAN to the third WCD, (ii) is transmitted according to the first wireless communication technology, and (iii) includes third WCD identifier.

7. The method of claim 1, wherein the second wireless communication technology is one of a technology using infrared wireless signals, BLUETOOTH, and IEEE 802.11.

8. The method of claim 1, wherein the RAN radiates to define wireless coverage areas, the method further comprising:

before the first WCD makes the first determination, the first WCD making a second determination that the first WCD is served by a wireless coverage area of the RAN, wherein the first WCD making the first determination comprises the first WCD detecting that it is no longer served by the wireless coverage area of the RAN.

9. A method performed by a radio access network (RAN) that is capable of communicating with a first wireless communication device (WCD) and a second WCD via a first wireless communication technology, wherein the first WCD and the second WCD are end-user devices, wherein the first WCD is associated with a first WCD identifier, wherein the first WCD and the second WCD are capable of communicating with one another via a second wireless communication technology, and wherein the first WCD and the RAN share a secret key, the method comprising:

the RAN receiving a first message from the second WCD, wherein the first message (i) seeks to disable paging from the RAN to the first WCD, (ii) includes the first WCD identifier, wherein the first message is provided by the second WCD in response to the second WCD receiving, from the first WCD, a signal triggered by the first WCD failing to communicate properly with the RAN, and wherein at least the first WCD identifier in the first message is digitally signed using the secret key; and in response to receiving the first message, the RAN applying the secret key to authenticate the digital signature of the first WCD identifier in the received message, and the RAN disabling paging to the first WCD.

10. The method of claim 9, wherein the RAN includes a server and a visitor location register (VLR), wherein the VLR contains an entry for the first WCD, wherein the entry causes the RAN to enable paging for the first WCD, and wherein the RAN receiving the first message comprises the server receiving the first message, the method further comprising:

in response to receiving the first message, the server transmitting a second message to the VLR, wherein the RAN disabling paging to the first WCD comprises the VLR deleting the entry for the first WCD.

11. The method of claim 9, further comprising:

after disabling paging to the first WCD, the RAN receiving a registration message from the first WCD; and in response to receiving the registration message, the RAN registering the first WCD, thereby enabling paging once again for the first WCD.

12. The method of claim 9, wherein the RAN is capable of communicating with a third WCD via the first wireless communication technology, wherein the third WCD is an end-user device, wherein the third WCD is capable of communicating with the second WCD via the second wireless communication technology, and wherein the third WCD is associated with a third WCD identifier, the method further comprising:

the RAN receiving a second message from the second WCD, wherein the second message (i) seeks to disable paging from the RAN to the third WCD, (ii) includes the third WCD identifier; and in response to receiving the second message, the RAN disabling paging to the third WCD.

13. The method of claim 9, wherein the first message comprises a Short Message Service (SMS) protocol message.

14. A first wireless communication device (WCD), wherein the first WCD is an end-user device, the first WCD comprising:

a processor capable of executing program instructions;

a first logical interface capable of communicating via a first wireless communication technology with a radio access network (RAN), wherein the RAN is associated with a RAN identifier, wherein the first WCD and the RAN share a first secret key;

a second logical interface capable of communicating via a second wireless communication technology with other WCDs;

a data storage containing program data and program instructions executable by the processor, wherein the program data includes a first WCD identifier associated with the first WCD, wherein the program instructions are executable by the processor to perform a client function and a relay function, wherein the client function involves (i) the first WCD making a first determination that the first WCD has failed to communicate properly with the RAN, (ii) the first WCD digitally signing at least the first WCD identifier with the first secret key, and (iii) the first WCD transmitting, on the second logical interface, a first message to a second WCD, wherein the first message seeks to disable paging from the RAN to the first WCD, wherein the first message includes the signed first WCD identifier, wherein the second WCD is an end-user device, thereby providing the RAN with information with which to authenticate that an entity seeking to disable paging to the first WCD is the first WCD, and wherein the relay function involves (i) the first WCD receiving a second message, on the second logical interface, from a third WCD, and (ii) transmitting a third message, on the first logical interface, to the RAN, wherein the second message seeks to disable paging from the RAN to the third WCD, wherein the second message includes a second WCD identifier, wherein the third WCD is an end-user device, and wherein the second WCD identifier is associated with the third WCD.

15. The first WCD of claim 14, wherein the RAN is associated with a RAN identifier, wherein the client function also involves (i) before transmitting the first message, the first WCD determining a list of WCDs with which the first WCD can communicate using the second wireless communication technology, (ii) the first WCD transmitting, on the second logical interface, the RAN identifier to each WCD in the list of WCDs in a probe message, and (iii) the first WCD receiving, on the second logical interface, a response to the probe message from the second WCD, wherein the list of WCDs includes the second WCD, and wherein the response indicates that the second WCD is capable of communicating with the RAN.

16. The first WCD of claim 14, wherein the third WCD and the RAN share a second secret key, and wherein the relay function also involves the first WCD copying a signed third WCD identifier from the second message to the third message, thereby providing the RAN with information with which to authenticate that an entity seeking to disable paging to the third WCD is the third WCD.

17. The first WCD of claim 14, wherein the second wireless communication technology is one of a technology using infrared wireless signals, BLUETOOTH, and IEEE 802.11.

* * * * *